Feb. 6, 1934.  N. B. WALES  1,946,247
BREWING DEVICE
Filed Dec. 12, 1933   2 Sheets-Sheet 1

INVENTOR

Patented Feb. 6, 1934

1,946,247

UNITED STATES PATENT OFFICE 1,946,247

BREWING DEVICE

Nathaniel B. Wales, New York, N. Y.

Application December 12, 1933
Serial No. 701,955

5 Claims. (Cl. 219—44)

This invention relates to improvements in brewing apparatus and has for one of its prime objects a unitary self-contained device that is devised to operate without any particular or specific co-operating water receptacle, therefor. As illustrated, it is shown dropped into a conventional coffee cup. A device of this nature to brew coffee, for instance, at the table in individual cups must function in a minimum of time and this invention has attained this desirable feature.

Another object is to provide a handy compact coffee making device that can be easily traveled with and which will quickly make coffee by inserting it even in an ordinary drinking glass or the like. Furthermore, it provides for its own heat without necessitating the boiling of water for the brewing.

Instead of heating the entire water body in the co-operating water receptacle by some heating source, as is now conventional in brewing devices for coffee, my invention focuses the heat as generated from an electric resistance element directly within and throughout the submerged water elevating duct itself and minimizes the direct flow of heat to the water in the liquid receptacle or cup. In this manner, its water elevating action, quite similar to the Pohle airlift, is almost immediate, and also highly efficient.

A further object I attain is that as the hot water, circulated by its lessened specific gravity, passes into the coffee container and flows through the ground coffee therein, the liquid in the cup remains relatively cool. The coffee is brewed very quickly by this heat focus, and in not over three to four minutes, the water in the container becomes coffee of normal strength, but always far below the boiling point.

By actual experimentation, I have found and this fact is borne out by the theory underlying the Pohle air-lift, wherein I substitute water vapor for air as a lifting medium, that if I do not attempt to lift the heated water above the liquid level in the brewing vessel the volume percentage of actual steam to hot water entering the ground coffee container is at an actual minimum. In fact, no steam is present in the coffee chamber during the three to four minute brew. This absence of steam is highly desirable in effecting a relatively low temperature brew, now considered the most desirable from a standpoint of health as compared with the patent to T. Abtmeyer, No. 1,308,023, in which the heated water is lifted well above the liquid level in the brewing vessel, as is also conventional in existing percolators and in which a very considerable volume of steam at all times envelopes the ground coffee. Such percolators are also naturally slow in operation as compared to my invention because they must generate relatively large volumes of steam to overcome the liquid lift involved in their design. I, therefore, position the ground coffee container so that its base is actually submerged as and when the cup is full and consequently the heated water elevation factor is approximately zero. I have found on the other hand that if the ground coffee container is wholly submerged, or even the major part thereof, that the water displaced by it when lowered into a small vessel or a cup, for instance, causes an initial overflow so that after brewing the coffee, during which time the ground coffee has absorbed considerable water, I have not more than a half cupful of coffee remaining for use.

It is, therefore, quite essential in a practical device, as I have illustrated, to have this relative position of the bottom of the coffee container to the liquid level of the water in the cup within the limits specified for reasons given above.

The resulting quick infusion and non-boiling factor of my invention enhances the aroma and superlative taste of the coffee. Another object is to produce a brewing device which can be easily and completely cleaned by being able to quickly withdraw the electric heater from the interior of the water duct at each emptying of the coffee container. Other objects and salient detail will be more fully described in the following specification.

In the accompanying drawings, Fig. 1 illustrates my invention in partial sectional elevation inserted in an ordinary coffee cup, clearly illustrating the liquid level relationship to give a rapid low-temperature circulation of water therein.

Fig. 2 shows a perspective view of the heating element removed from the coffee container. The heating element, as can be seen in its simple form, may be used as a general utility immersion heater. The cover acts as a rest or guard to prevent the hot element from burning a table top.

Figure 1:
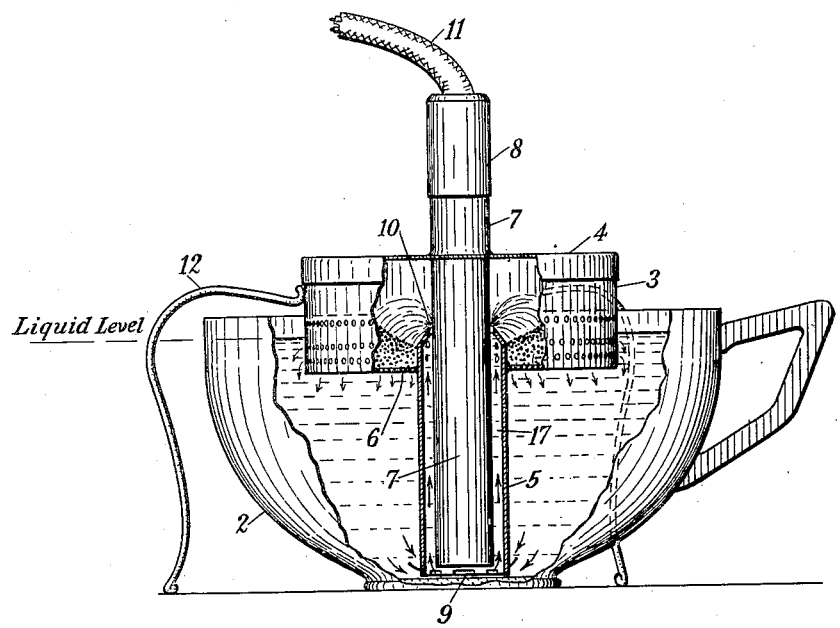
Figure 2:
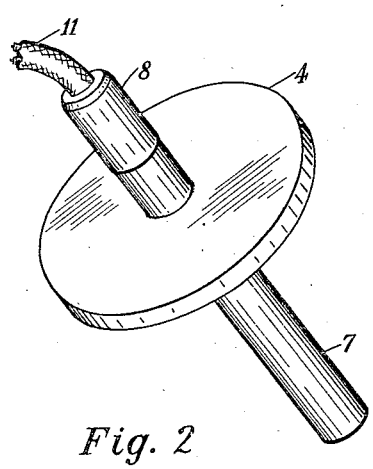
Figure 3:
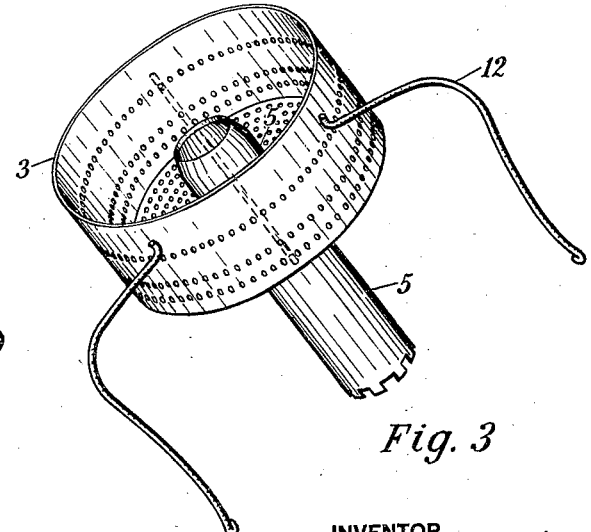
Fig. 3 shows the perforated coffee container in perspective elevation with its co-operating tube which forms the water circulating duct. The supporting legs are also shown to sustain the device when either in or out of the cup.

Referring to the drawings in Fig. 1, numeral 2 is any conventional coffee cup, 3 is the perforated ground coffee container, permanently secured to the tube 5 through its base 6, tube 5 forms an annulus when the immersion type of electric heater 7 is inserted therein and this assembly forms the water circulating duct enveloping the heater 7 and exposing thereto a relatively thin wall of water which quickly heats to an operating temperature. I am well aware that this specific combination of an electric heater in a surrounding tube is public property as evidenced in Patent No. 1,134,661. A cover 4 preferably permanently secured to the heater 7 concentrically registers with the coffee container 3 so that when placed in position on container 3, see Fig. 1, the tubes 5 and 7 are approximately concentric. A single vertical restricted orifice 10 formed by the tube 5 and the heater 7 is seen at the upper extremity of tube 5 which is positioned at approximately liquid level and water inlet openings 9 at its submerged end. A heat insulation member 8 is secured to the upper end of the heater tube through which extends the electric supply cable 11. A plurality of supports 12 are shown to sustain the brewing device in operatable position in the cup 2, sustained exteriorly to the cup or vessel so as to serve at all times as proper supports for the coffee container 3.

Figure 4:
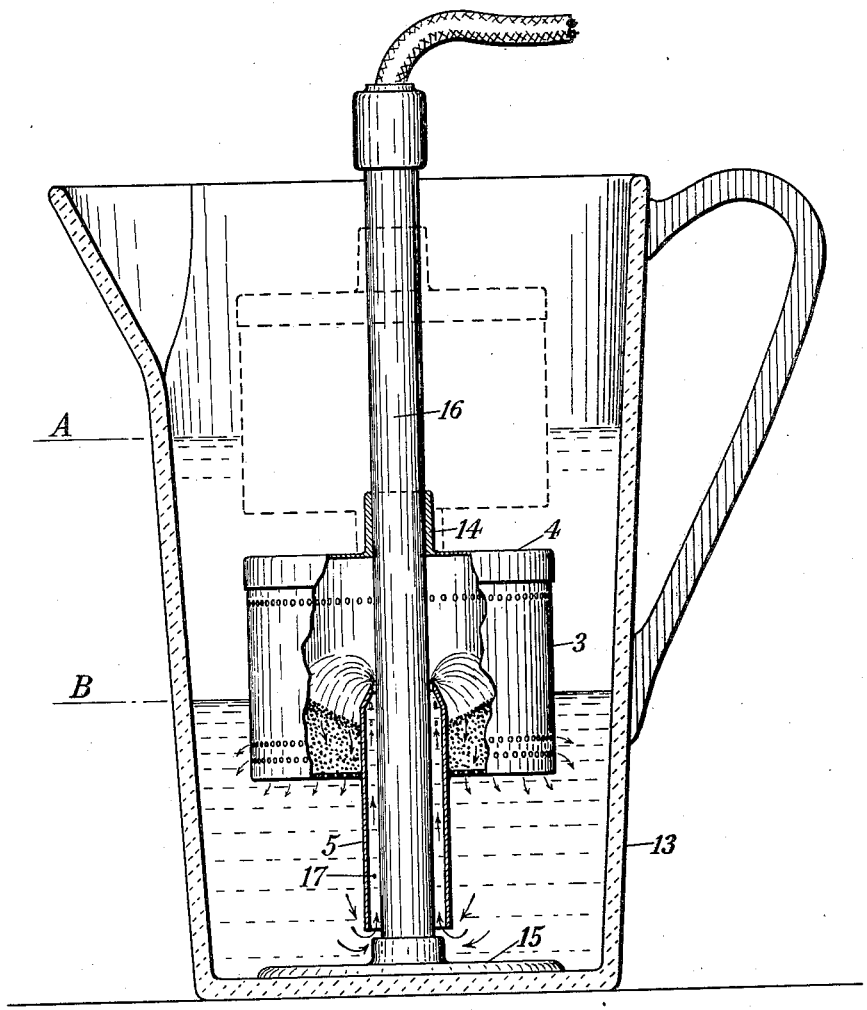
Fig. 4 is a modification of my invention adapted to a larger container such as a pitcher or the like and in which the coffee container is slidable on the heating element to adapt itself for different sized brews with consequent varying liquid levels therein so as to maintain a zero lift factor.

A modification of my invention adapts itself to glass pitchers or ordinary conventional kitchen utensils, as shown in Fig. 4 wherein 13 is any such receptacle. The device is identical to the cup type as illustrated in Fig. 1 except that the cover 4 has a sleeve 14 secured to its central portion which is slidably movable on the immersion heater 16. A vessel of the general shape of 13 has widely variable liquid levels if it is desired to make only two cups of coffee or six. In order to freely and quickly circulate the water in annulus 17 and container 3 and maintain the same free circulation as is illustrated in Fig. 1 with only heated water and no free steam which always extracts tannins and tart acid components from the coffee. The entire coffee brewing device can easily be adjusted on its heater supporting axis to the existing liquid level. A suitable detachable pedestal support is shown at 15. The device at liquid level A is shown in dotted outline while at liquid level B, as illustrated, is in full lines.

The operation of my device is extremely fast and simple. On filling the cup 2 with cold water and the container with ground coffee, slide the heater 7 into the tube 5 and press on the cover 4 to the container 3; lower the device into the cup 2 until it stands on its legs 12; turn on the electricity through cable 11, and in not over three to four minutes a hot cup of coffee is ready of excellent bouquet, due to the non-boiling of the liquid in the cup and the relatively large volume of heated water which has quickly passed through container 3 giving a most effective infusion. The invention is exceedingly practical and can be sold at a very low price.

I claim as my invention:

1. A brewing device adapted to be inserted into a receptacle filled with water, comprising a coffee container, an open-ended tube secured to and terminating at its upper end within said container and protruding through and below the bottom of said container at its lower end, an electric heater of the immersion type, a cover for said container secured to said heater and means thereby to detachably mount said heater in an axial position within said tube by the fitting of said cover on to said container.

2. A device to brew coffee when positioned in a cup to be filled with water comprising a water circulating duct depending within said cup, electric heating means therein adapted to concentrate the heat thereof on the water within said duct, the lower open end of said duct terminating beneath the liquid level in said cup and the upper end of said duct terminating therein approximately at the normal liquid level in said cup and in open connection with a coffee holding receptacle therefor, the base of said receptacle being immersed in said normal liquid level therein.

3. A brewing device adapted to be inserted in a cup normally filled with water, comprising a perforated coffee container sustained by legs exteriorly supported thereof at approximately the normal water level therein, an open ended tube extending through said container and projecting below the bottom of said container, an electric heater of the immersion type, a cover for said container, said heater secured to said cover and means to detachably mount said heater in said tube by the fitting of said cover on to said container.

4. A brewing device of the type described wherein the device is suspended within a common coffee cup filled with water, a plurality of circumferentially disposed supporting means exterior to said cup and entirely free thereof and supporting said brewing device within said cup.

5. A brewing device of the type described wherein the entire device is held suspended within a common coffee cup and supported by a plurality of legs spaced circumferentially outside of said cup, said legs being supported exteriorly thereof.

NATHANIEL B. WALES.